Sept. 5, 1950     F. E. RICHARDSON     2,521,539
WHEEL BLOCK FOR VEHICLES
Filed April 15, 1948
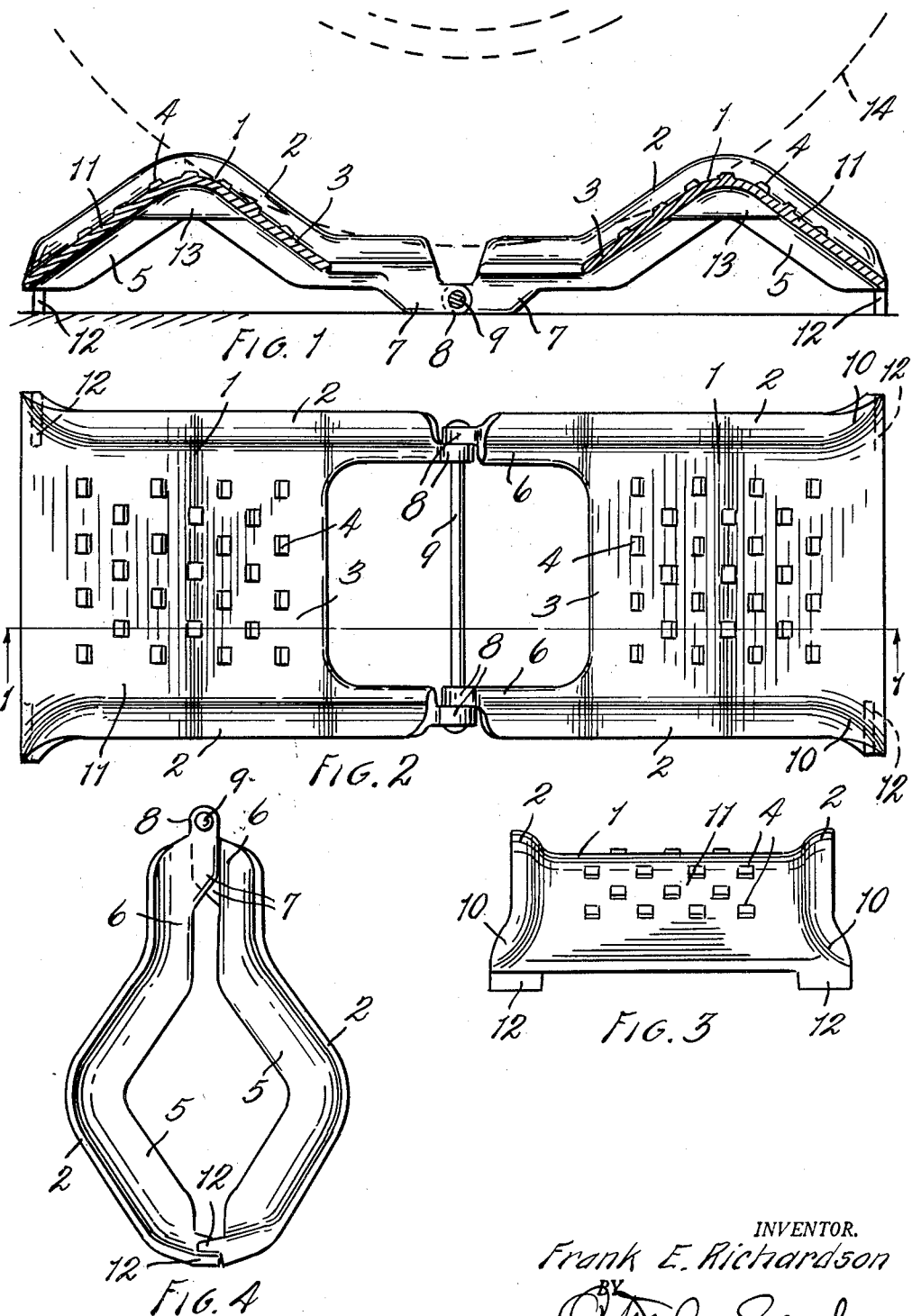
INVENTOR.
Frank E. Richardson
BY
Otto A. Earl
Attorney.

Patented Sept. 5, 1950

2,521,539

UNITED STATES PATENT OFFICE 2,521,539

WHEEL BLOCK FOR VEHICLES

Frank E. Richardson, Concord, Mich.

Application April 15, 1948, Serial No. 21,190

9 Claims. (Cl. 188—32)

This invention relates to improvements in a wheel block for vehicles.

The main objects of this invention are:

First, to provide a wheel block for the vehicle, such as motor vehicles, which is efficient for the purpose, convenient to use and one which may be collapsed into a compact form when not in use.

Second, to provide a wheel block which permits a wheel being driven into supported position on the block or from the block.

Third, to provide a wheel block which may be formed of a relatively light metal or metal alloy and at the same time has sufficient strength to withstand the load.

Further objects relating to details and economies of the invention will definitely appear from the description to follow. The invention is pointed out in the claims.

A preferred embodiment of the apparatus for carrying out the invention is clearly illustrated in the accompanying drawing, in which:

Fig. 1 is a longitudinal section of my wheel block on a line corresponding to line 1—1 of Fig. 2 with the block in extended position resting upon a hard surface which is not penetrated by the anchoring lugs, a motor vehicle wheel being indicated in supported position by dotted lines.

Fig. 2 is a plan view with the wheel block members in extended position.

Fig. 3 is an end elevational view.

Fig. 4 is a side elevational view with the block members in collapsed position.

It is a matter of general knowledge that it is quite dangerous to attempt to jack up one wheel of a motor vehicle for changing a tire or repairs, particularly on surfaces such as are encountered along highways or even in garages where lifting jacks of the type commonly available outside of regular repair shops or garages are used and numerous persons have been injured and some killed as a result of the vehicle moving and the jack tipping over and letting part of the vehicle jacked up drop. My wheel block is especially designed so that it may be carried in an automobile or truck and used as occasion requires, constituting an effective block for the vehicle.

The embodiment of my invention illustrated comprises a pair of A-shaped or arched wheel block members 1—1 having upwardly projecting side rims 2—2. The tread portions 3 are preferably transversely flat, as illustrated, and have traction lugs 4 spaced thereon. The inner sides of the rims 2 are inwardly inclined being desirably transversely curved and merge into the tread portion 3. Flanges 5 extend downwardly from the rims at the side edges of the tread portion the rims and these flanges being extended beyond the tread portion to provide inwardly projecting arm portions 6—6. These arm portions have downwardly offset inner end portions 7 terminating in pivot ears 8. The pivot ears are so arranged that they overlap to receive the pivot rod 9. This pivot rod constitutes a handle so that when the members are in extended position, as shown in Figs. 1 and 2, they may be picked up by grasping the pivot rod and are swung by gravity into back to back relation, as shown in Fig. 4.

The downwardly offset portions 7 serve as rests for the inner ends of the clock members. The rim members are preferably flared outwardly at 10 to coact in guiding the wheel onto the ramp portions 11 of the block members. The block members are provided with anchoring lugs 12 at their outer ends one lug of each member being offset relative to the other to permit corresponding lugs of the other block member to telescope therewith when the members are collapsed back to back, as shown in Fig. 4. On soft ground or on soft surface these lugs 12 are imbedded. In Fig. 1 I illustrate them as supported on a hard surface.

The downwardly offset portions 7 are also likely to be at least partially imbedded on the soft or yielding surface such as the ground. This prevents the wheel block from skidding or slipping either sidewise or longitudinally.

To reinforce the arches of the members, particularly when they are formed of relatively light stock, I preferably provide longitudinally disposed integral struts 13 disposed on the under side of the treads of the member at their apex. These struts with the rims and side flanges effectively reinforce the tread portions so that they may be relatively light and at the same time possess sufficient strength for the purpose.

In collapsed position my improved wheel block is quite compact and can be conveniently stored and handled. In Fig. 1 I illustrate conventionally by dotted lines a wheel tire 14 of a vehicle.

I have illustrated and described my invention especially designed by me for the use in blocking of a wheel of a motor vehicle in which the opposite wheel is to be jacked up. I have not illustrated and described my invention in other adaptations and particular uses as it is believed that this disclosure will enable those skilled in the art to embody or adapt my invention as may be desired.

Having thus described my invention what I claim as new and desire to secure by Letters Patent is:

1. A wheel block comprising a pair of A-shaped members having substantially flat tread portions provided with spaced surface lugs, and upwardly projecting side rims having inwardly inclined inner sides merging into the tread portions, said rim portions being flared outwardly at their outer ends, said block members having downwardly projecting flanges at their side edges, said rims and flanges being extended at their inner ends providing arms, said arms having downwardly offset portions at their inner ends constituting support members and terminating in pivot ears, and a pivot rod pivotally connecting said pivot ears and constituting a handle facilitating the collapsing and carrying of the block, the block members when extended coacting to provide a trough-like rest for a wheel, said block members having downwardly projecting anchoring lugs at their outer corners, one lug of each member being offset relative to the other to permit corresponding lugs of the block members to telescope when the members are collapsed back to back.

2. A wheel block comprising a pair of A-shaped members having substantially flat tread portions provided with spaced surface lugs, and upwardly projecting side rims having inwardly inclined inner sides merging into the tread portions, said block members having downwardly projecting flanges at their side edges, said rims and flanges being extended at their inner ends providing arms, a pivot rod pivotally connecting said arms and constituting a handle facilitating the collapsing and carrying of the block, the block members when extended coacting to provide a trough-like rest for a wheel.

3. A wheel block comprising a pair of A-shaped members having substantially flat tread portions provided with spaced surface lugs, and upwardly projecting side rims having inwardly inclined inner sides merging into the tread portions, said block members having downwardly projecting flanges at their side edges and central reinforcing longitudinally disposed struts on their under sides, said rims and flanges being extended at their inner ends providing arms, said arms having downwardly offset portions at their inner ends constituting support members and terminating in pivot ears, and a pivot rod pivotally connecting said pivot ears and constituting a handle facilitating the collapsing and carrying of the block, the block members when extended coacting to provide a trough-like rest for a wheel.

4. A wheel block comprising a pair of A-shaped members having substantially flat tread portions provided with spaced surface lugs, and upwardly projecting side rims, said block members having downwardly projecting flanges at their side edges, said rims and flanges being extended at their inner ends providing arms, said arms having downwardly offset portions at their inner ends constituting support members and terminating in pivot ears, and means pivotally connecting said pivot ears, the block members when extended coacting to provide a trough-like rest for a wheel, said block members having downwardly projecting anchoring lugs at their outer ends.

5. A wheel block comprising a pair of A-shaped members having substantially flat tread portions provided with spaced surface lugs, and upwardly projecting side rims, said rims being extended at their inner ends providing arms, said arms terminating in pivot ears, and means pivotally connecting said pivot ears, the block members when extended coacting to provide a trough-like rest for a wheel, the arms constituting surface-engaging load supports.

6. A wheel block comprising a pair of members having transversely arched tread portions, with upwardly projecting side rims merging into the tread portions, said rims being extended at their inner ends providing arms, said arms having downwardly offset portions at their inner ends constituting support members and terminating in pivot ears, and a pivot connection for said pivot ears, the block members when extended coacting to provide a trough-like rest for a wheel with outwardly inclined ramps, said block members having downwardly projecting anchoring lugs at their outer ends.

7. A wheel block comprising a pair of members having transversely arched tread portions, with upwardly projecting side rims merging into the tread portions, said rims being extended at their inner ends providing arms, said arms terminating in pivot ears, and a pivot connection for said pivot ears, the said arched tread portions of the block members when extended coacting to provide a trough-like rest for a wheel with outwardly inclined ramps, both members having support engaging portions adjacent their pivot connection.

8. A wheel block comprising a pair of A-shaped members having tread portions provided with side rims the inner sides of which merge into the tread portions, said block members having inwardly extending arms at their inner ends provided with pivot ears, a pivot rod pivotally connecting said pivot ears, said block members coacting to provide a trough-like rest for a wheel when in extended position and resting upon a surface, the inner edges of the tread portions being substantially spaced when in such position to receive a portion of a tire between them, both members having surface-engaging support portions adjacent their pivot connection.

9. A wheel block comprising a pair of A-shaped members having tread portions provided with side rims the inner sides of which merge into the tread portions, said block members having pivot connections at their inner ends, both members having surface-engaging supports adjacent their pivot connections, said block members coacting to provide a trough-like rest for a wheel when in extended position and resting upon a surface, the outwardly inclined portions of the A-shaped members constituting ramps merging into the inwardly inclined portions thereof.

FRANK E. RICHARDSON.

REFERENCES CITED

The following references are of record in the file of this patent:

UNITED STATES PATENTS

| Number | Name | Date |
|---|---|---|
| 1,276,430 | Smith | Aug. 20, 1918 |
| 1,465,852 | Lane | Aug. 21, 1923 |
| 2,065,528 | Jolly | Dec. 29, 1936 |
| 2,441,627 | Gregg | May 18, 1948 |

FOREIGN PATENTS

| Number | Country | Date |
|---|---|---|
| 310,185 | Great Britain | Apr. 25, 1929 |